United States Patent
Chengalva

(10) Patent No.: US 10,391,972 B1
(45) Date of Patent: Aug. 27, 2019

(54) SEAT ASSEMBLY, SEATBELT SECURITY SYSTEM, AND METHOD

(71) Applicant: The Boeing Company, Chicago, IL (US)

(72) Inventor: Mahesh K. Chengalva, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/956,560

(22) Filed: Apr. 18, 2018

(51) Int. Cl.
| | |
|---|---|
| *B60R 21/00* | (2006.01) |
| *B60R 22/48* | (2006.01) |
| *B64D 11/06* | (2006.01) |
| *B60R 21/015* | (2006.01) |

(52) U.S. Cl.
CPC ........ *B60R 22/48* (2013.01); *B60R 21/01516* (2014.10); *B60R 21/01546* (2014.10); *B64D 11/062* (2014.12); *B60R 2021/0093* (2013.01); *B60R 2022/4816* (2013.01); *B60R 2022/4858* (2013.01)

(58) Field of Classification Search
CPC .............. B60R 22/48; B60R 21/01516; B60R 21/01546; B60R 2021/0093; B60R 2022/4816; B60R 2022/4858; B64D 11/062
USPC ................................ 340/457.1, 539.1, 539.11
See application file for complete search history.

(56) References Cited

U.S. PATENT DOCUMENTS

| | | |
|---|---|---|
| 5,555,548 A | 9/1996 | Large |
| 6,448,907 B1 | 9/2002 | Naclerio |
| 2003/0014166 A1 | 1/2003 | Chinigo et al. |
| 2003/0160497 A1 | 8/2003 | Darr |
| 2005/0061568 A1* | 3/2005 | Schondorf ............. B60R 22/48 180/268 |
| 2017/0144774 A1* | 5/2017 | Pollard ................ B64D 11/062 |

OTHER PUBLICATIONS

MCMAH, Boeing to test laser that could help pilots avoid turbulence, Sep. 19, 2017, http://www.news.com.au/travel/travel-advice/health-safety/boeing-to-test-laser-that-could-help-pilots-avoid-turbulence/news-story/b3124dc0057dc4142adaf5fd7a704005 accessed Apr. 18, 2018.

European Office Action for European Patent Application No. EP 19163602.6 dated Jun. 18, 2019.

European Search Report for European Patent Application No. EP 19163602.3 dated Jun. 4, 2019.

* cited by examiner

*Primary Examiner* — Daryl C Pope

(74) *Attorney, Agent, or Firm* — Kunzler Bean & Adamson

(57) ABSTRACT

A seat assembly comprises a seat. The seatbelt securing system further comprises a seatbelt coupled to the seat. The seatbelt comprises a first strap and a second strap. The seatbelt further comprises a latch configured to selectively secure the first strap relative to the second strap. The latch further comprises a latch sensor configured to provide a secured indication in response to detection that the latch properly secures the first strap of the seatbelt to the second strap of the seatbelt and provide an unsecured indication in response to detection that the latch does not properly secure the first strap of the seatbelt to the second strap of the seatbelt. The latch further comprises a latch indicator to provide a warning in response to the unsecured indication.

20 Claims, 6 Drawing Sheets

SEAT ASSEMBLY, SEATBELT SECURITY SYSTEM, AND METHOD

FIELD

This disclosure relates generally to vehicles, and more particularly to seatbelt systems for securing passengers to a seat.

BACKGROUND

Seatbelts promote the safety of passengers while traveling in a vehicle. Seatbelts apply a restraining force to counteract an ejecting force which would otherwise unsettle the occupant of the seat. The restraining force maintains the occupant in position on the seat to reduce the chance of injury in the presence of an ejecting force. Generally, seatbelts are releasably secured by a latch. For the seatbelt to function in the intended manner, the latch must be properly secured at the time an ejecting force is applied to the occupant. Assuring the latch of a seatbelt is properly secured, particularly in the case of a mass transportation vehicle, may be difficult, labor intensive, and time consuming.

SUMMARY

The subject matter of the present application has been developed in response to the present state of the art, and, in response to the problems and disadvantages associated with conventional methods for determining whether a seatbelt latch is properly secured. Accordingly, the subject matter of the present application has been developed to improve seatbelt security that overcomes at least some of the above-discussed shortcomings of prior art techniques.

Described herein is a seat assembly comprising a seat. The seatbelt security system further comprises a seatbelt coupled to the seat. The seatbelt comprises a first strap and a second strap. The seatbelt further comprises a latch to selectively secure the first strap relative to the second strap. The latch further comprises a latch sensor configured to provide a secured indication in response to detection that the latch properly secures the first strap of the seatbelt to the second strap of the seatbelt and provide an unsecured indication in response to detection that the latch does not properly secure the first strap of the seatbelt to the second strap of the seatbelt. The latch further comprises a latch indicator to provide a warning in response to the unsecured indication. The preceding subject matter of this paragraph characterizes example 1 of the present disclosure.

The seat assembly further comprises an occupancy sensor configured to provide an occupied indication in response to the seat being occupied and to provide an unoccupied indication in response to the seat being unoccupied. The indicator on the latch is configured to prevent a warning in response to the unsecured indication when the occupancy sensor provides the unoccupied indication. The preceding subject matter of this paragraph characterizes example 2 of the present disclosure, wherein example 2 also includes the subject matter according to example 1, above.

The seat assembly further comprises a proximal indicator positioned to spatially correspond with the seatbelt, the proximal indicator configured to produce at least one of a light, a sound, or a vibration in response to the unsecured indication. The preceding subject matter of this paragraph characterizes example 3 of the present disclosure, wherein example 3 also includes the subject matter according to any one of examples 1 or 2, above.

The seat assembly wherein the proximal indicator comprises a display screen configured to provide a visual warning in response to receiving the unsecured indication. The preceding subject matter of this paragraph characterizes example 4 of the present disclosure, wherein example 4 also includes the subject matter according to any one of examples 1-3, above.

The visual warning comprises an indication of a status of the seatbelt. The preceding subject matter of this paragraph characterizes example 5 of the present disclosure, wherein example 5 also includes the subject matter according to any one of examples 1-4, above.

The visual warning comprises instructions describing how to properly secure the seatbelt. The preceding subject matter of this paragraph characterizes example 6 of the present disclosure, wherein example 6 also includes the subject matter according to any one of examples 1-5, above.

The display screen is configured to interrupt a current display object to communicate warning to the user of the seatbelt. The preceding subject matter of this paragraph characterizes example 7 of the present disclosure, wherein example 7 also includes the subject matter according to any one of examples 1-6, above.

The indicator on the latch comprises at least one of a light source capable of illumination in response to the unsecured indication, a vibration device capable of producing vibrational feedback in response to the unsecured indication, and a speaker capable of producing audio stimulus in response to the unsecured indication. The preceding subject matter of this paragraph characterizes example 8 of the present disclosure, wherein example 8 also includes the subject matter according to any one of examples 1-7, above.

The latch sensor communicates with a computing device to generate at least one of the secured indication and the unsecured indication. The preceding subject matter of this paragraph characterizes example 9 of the present disclosure, wherein example 9 also includes the subject matter according to any one of examples 1-8, above.

The latch indicator is in communication with the computing device to provide the warning in response to the unsecured indication. The preceding subject matter of this paragraph characterizes example 10 of the present disclosure, wherein example 10 also includes the subject matter according to any one of examples 1-9, above.

Further described herein is a seatbelt security system that comprises a seat assembly. The seat assembly comprises a seat. The seat assembly further comprises a seatbelt coupled to the seat. The seatbelt comprises a first strap and a second strap. The seatbelt further comprises a latch to selectively secure the first strap relative to the second strap. The latch comprises a latch sensor configured to detect that the first strap is properly secured to the second strap via the latch and detect that the first strap is not properly secured to the second strap via the latch. The seat assembly further comprises a proximal indicator spatially proximate the seat. The proximal indicator is configured to provide a proximal warning. The seatbelt security system further includes a computing device configured to provide an unsecured indication in response to detection by the latch sensor that the first strap of the seatbelt is not properly secured to the second strap of the seatbelt via the latch. The seatbelt security system further includes a remote indicator positioned to provide a remote warning at a location separate from the seat assembly in response to the unsecured indication. The preceding subject matter of this paragraph characterizes example 11 of the present disclosure.

The seatbelt security system wherein the seat assembly further comprises an occupancy sensor configured to provide an occupied indication in response to the seat assembly being occupied and to provide an unoccupied indication in response to the seat assembly being unoccupied. The proximal indicator is configured to prevent a warning in response to the unsecured indication when the occupancy sensor provides the unoccupied indication. The preceding subject matter of this paragraph characterizes example 12 of the present disclosure, wherein example 12 also includes the subject matter of example 11, above.

The seatbelt security system wherein the computing device is further in communication with the remote indicator. The computing device is configured to activate and deactivate at least one of the latch sensor 210, the proximal indicator 222, and the remote indicator in response to at least one of a manual input from a crew member, a turbulence status, a cruise status, and a travel transition indication. The preceding subject matter of this paragraph characterizes example 13 of the present disclosure, wherein example 13 also includes the subject matter according to any one of examples 11 or 12, above.

The latch further comprises a latch indicator coupled to the latch. The computing device activates the latch indicator to provide a warning at the latch in response to the unsecured indication. The preceding subject matter of this paragraph characterizes example 14 of the present disclosure, wherein example 14 also includes the subject matter according to any one of examples 11-13, above.

The remote indicator comprises at least one of a central display and a mobile device. The computing device activates the at least one of the central display and a mobile device to provide the remote warning in response to the unsecured indication. The preceding subject matter of this paragraph characterizes example 15 of the present disclosure, wherein example 15 also includes the subject matter according to any one of examples 11-14, above.

Further described herein is a method for seatbelt security comprising determining an occupancy of a seat based on a signal from an occupancy sensor. The method further comprises requesting a status of a seatbelt latch in response to a determination that the seat is occupied. The method further comprises receiving a latch signal from a latch sensor in response to the request. The method further comprising, in response to the latch signal indicating that the seatbelt latch is unsecured, providing at least one of a proximal warning spatially proximate the seat and a remote warning spatially remote from the seat. The preceding subject matter of this paragraph characterizes example 16 of the present disclosure.

At least one of the proximal warning and the remote warning is provided further in response to at least one of receiving a manual input to activate a secure seatbelt mode and receiving a detection of at least one travel transition. The preceding subject matter of this paragraph characterizes example 17 of the present disclosure, wherein example 17 also includes the subject matter according to example 16, above.

Providing the proximal warning comprises generating the proximal warning at at least one of a latch indicator and a proximal indicator. The preceding subject matter of this paragraph characterizes example 18 of the present disclosure, wherein example 18 also includes the subject matter according to any one of examples 16 or 17, above.

Providing the remote warning comprises activating a central display spatially remote from the seat to display the remote warning. The preceding subject matter of this paragraph characterizes example 19 of the present disclosure, wherein example 19 also includes the subject matter according to any one of examples 16-18, above.

Providing the at least one of the proximal warning and the remote warning comprises activating a mobile device to display a warning. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
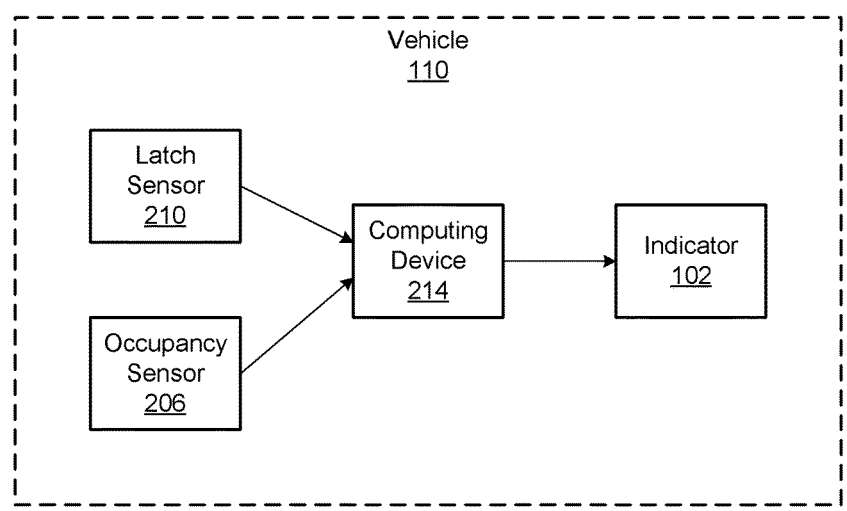
FIG. 1 is a schematic block diagram of a vehicle, according to one or more examples of the present disclosure.

Described below are embodiments that relate to a seatbelt security system. The seatbelt security system can provide an efficient, passenger-centric, way to improve the effectiveness and security of a seatbelt on a vehicle. The seatbelt security system described herein monitors a status of a seatbelt based on manual or automatic parameters. For example, the system may be turned on or off by an operator, crew, driver, passenger, and pilot. The system may also be turned on or off by a computing device operated by a set of automatic parameters such as a scheduled or routine event, dynamic detection of a travel transition, such as take-off, landing, parking, acceleration, and braking, and/or detection of a travel condition such as turbulence, wet or snowy roadways, an accident, and the like.

Embodiments of the seatbelt security system detect such conditions as may affect a person on a vehicle in a way that might be mitigated or aided by proper use of a seatbelt. The system can determine if the person is occupying their seat and if the seatbelt for that seat is properly engaged. A seatbelt is properly engaged if the latch of the seatbelt couples two strap portions of the seatbelt together in a manner which allows the seatbelt to restrain the occupant as intended during an event. Conversely, a seatbelt is not properly engaged if the latch of the seatbelt is uncoupled or is coupled in a manner which will not allow the seatbelt to restrain the occupant as intended during an event. It may be difficult for an occupant or staff to determine if the seatbelt is properly engaged. In part, embodiments described herein simplify, streamline, and make more accurate the process of checking seatbelts for proper engagement.

If the seatbelt is not properly engaged, a warning may be sent to the person to indicate that the seatbelt may not be properly engaged. In some situations, the person to whom the warning is communicated may be asleep, distracted, under stress, or otherwise prevented from receiving the warning. In some embodiments described below, the seatbelt security system provides the warning in one of more of several different types. For example, the warning may be communicated with a flashed light on the latch of the seatbelt. Additionally or alternatively, the warning may be communicated with a vibration of the latch of the seatbelt or other haptic measures. The warning may be communicated through a display positioned near the person such as an entertainment or information display, an overhead panel, a floorboard, a seatback in front of the person, or the like.

In some embodiments, a warning is also or alternatively communicated to staff such as an operator, crew, driver, pilot, etc. regarding the state of the person's seatbelt. With that warning, the staff can then act to remedy the situation to improve the safety of the person. For example, the staff may approach the person to calm the person or point out that the seatbelt is not secure or assist the person in securing the seatbelt. The warning may be communicated to the staff via central display, a mobile device carried by the staff, or an indicator in proximate the person. The warning may identify a seat location of the person for more rapid response in lieu of checking the seatbelt of every person on a vehicle. Given the relatively short window for a given situation in which the staff may be able to respond, embodiments described below can improve the safety of people on the vehicle and can improve the ability of the staff to quickly identify and address situations with seatbelts that may be dangerous if left unresolved. Further detail is described below with reference to the various figures.

FIG. 1 is a schematic block diagram of a vehicle 110 that includes a latch sensor 210, an occupancy sensor 206, a computing device 214, and an indicator 102, according to one or more examples of the present disclosure. In the example of FIG. 1, the latch sensor 210 is a sensor configured to detect a status of a seatbelt latch and communicate a latch signal to the computing device 214. The occupancy sensor 206 provides an occupied signal to the computing device in response to detection that a seat is occupied and provides an unoccupied signal to the computing device in response to detection that the seat is unoccupied. Based on the signals received from the latch sensor 210 and the occupancy sensor 206, the computing device 214 communicates information to an indicator 102 to cause the indicator 102 to indicate a warning. The indicator 102 may be a latch indicator, a proximal indicator, and/or a remote indicator as herein described.

Even though one latch sensor 210, one occupancy sensor 206, one computing device 214, and one indicator 102 are depicted in FIG. 1, one of skill in the art will recognize, in light of this disclosure, that any number of each component may be included in the vehicle 110.

In the illustrated example of FIG. 1, the latch sensor 210, the occupancy sensor 206, the computing device 214, and the indicator 102 are incorporated into a vehicle 110. However, in other examples, some or all of the occupancy sensor 206, the computing device 214, and the indicator 102 may be separate from the vehicle 110. For example, the computing device 214 may be separate from the vehicle 110 as described further below.

In certain embodiments, the vehicle 110 includes a plurality of computing devices 214 each communicatively coupled to one or more other computing devices 214. According to certain examples, the computing devices 214 of multiple vehicles 110 may be communicatively coupled together. The computing device 214 can include one or more processors and memory that cooperatively perform the corresponding functions described herein.

The vehicle 110 may be an aircraft. The aircraft may be any of various airplanes, such as commercial airplanes, private airplanes, fighter jets, propeller airplanes, and/or the like. The vehicle 110 may alternatively be a ship, a bus, a train, an automobile, a shuttle, a rollercoaster car or other amusement-style ride, or the like.

In some embodiments, the vehicle 110 includes multiple sensors for detecting and sampling data regarding operation of the vehicle 110, data about the vehicle's external environment, and/or the like. The vehicle 110 may also include multiple sensors for detecting and sampling data about the vehicle's interior environment, such as occupants, occupied seats, latch states, and the like. In certain embodiments, the vehicle's sensors include sensors for detecting an amount of pressure or force that is applied to the vehicle's brakes; sensors for detecting the vehicle's acceleration and/or deceleration; sensors for detecting an amount of thrust applied and/or output by the vehicle's engines or drive system, sensors for detecting approaching turbulence or travel conditions, an approaching destination, and/or the like.

In certain embodiments, the computing device 214 may be communicatively coupled to the sensors of the vehicle 110, to a central computing system of the vehicle 110, and/or to the sensors or central computing systems of other vehicles. In this manner, sensor data, for instance, may be transmitted from the vehicle 110 to a central computing system of the vehicle 110 and/or to one or more other vehicles over a data network such as a secure wireless communication network.

Figure 2A:
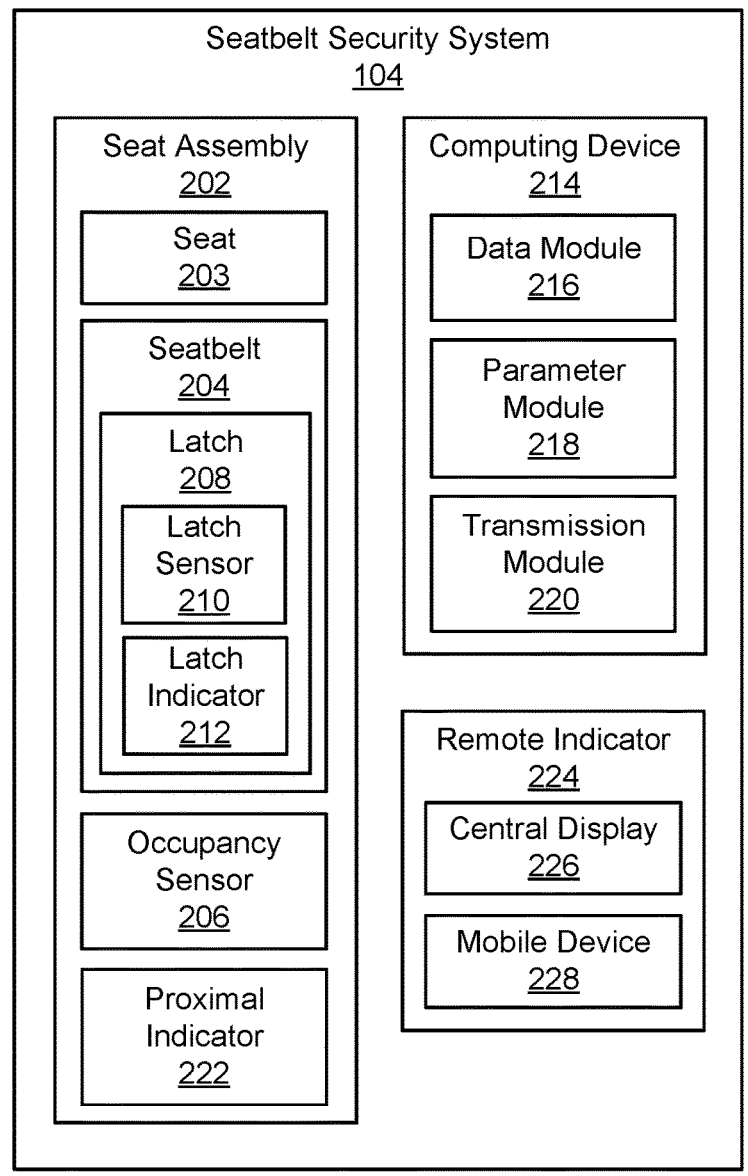
FIG. 2A is a schematic block diagram of a seatbelt security system that can be used with the vehicle of FIG. 1.

FIG. 2A is a schematic block diagram of a seatbelt security system 104 that can be used with a vehicle, such as the vehicle 110 of FIG. 1. In the illustrated embodiment, the seatbelt security system 104 includes a seat assembly 202. The seat assembly 202 includes a seat 203, a seatbelt 204, an occupancy sensor 206, and a proximal indicator 222. The seat 203 may be a passenger seat, a driver seat, a cargo lockdown platform, or other securing devices on a vehicle.

The seatbelt 204 may include a first strap 406, a second strap 408 (see, e.g., FIG. 5), and a latch 208. The first strap 406 and the second strap 208 can be coupled together via the latch 208. One of the first strap 406 and the second strap 408 may be longer or shorter than the other. Alternatively, the first strap 406 and the second strap 408 may be approximately the same length. In some embodiments, the entirety of the latch 208 is coupled to just one of the first strap 406 or the second strap 408. However, in other embodiments, separable portions of the latch 208 may be coupled to corresponding ones of the first strap 406 and the second strap 408 to couple the two straps together. The latch 208 may be a lever latch, a button latch, a slide latch, a harness, restraint bar, a cuff, a shackle, or the like.

In the illustrated embodiment, the latch 208 includes a latch sensor 210. The latch sensor 210 monitors the state of the latch 208. The latch sensor 210 may be an electrical sensor, an optical sensor, a mechanical sensor, a magnetic sensor, or the like. In some embodiments, the latch sensor 210 detects a coupling of the first strap 406 and the second strap 408 of the seatbelt 204 via the latch 208. The latch sensor 210 may be capable of distinguishing between a secure coupling and an unsecure coupling. The latch sensor 210 may also provide an indication of the state of the latch 208 in the form of a signal or other communication.

In some embodiments, the latch 208 further includes a latch indicator 212. The latch indicator 212 provides a warning, notification, or indication of the state of the latch 208. In some embodiments, the warning, notification, or indication is at least one of a visual, audio, or tactile stimulus. For example, the latch indicator 212 may provide a light, a sound, and/or a movement, such as a vibration. The latch indicator 212 may provide the indication in response to a detection, by the latch sensor 210, that the latch 208 is not coupled or is not securely coupled.

The occupancy sensor 206 of the seat assembly 202 detects the presence of a person or occupant on the seat 203. The occupancy sensor 206 may be disposed in the seat 203 or positioned near the seat 203 to detect the presence of an occupant on the seat 203. For example, the occupancy sensor 206 may be disposed on or in a surface the seat 203, in an overhead panel, on a seatback of a seat positioned in front of the seat 203, a wall or floor near the seat 203, or the like.

The occupancy sensor 206 provides an occupied indication in response to the seat 203 being occupied. The occupied indication may be a signal sent to or through one or more components of the seatbelt security system 104, such as the computing device 214, the latch sensor 210, and/or the latch indicator 212. For example, the occupied indication from the occupancy sensor 206 may be sent directly to the latch sensor 210 or the latch indicator 212 of the latch 208. The latch sensor 210 or the latch indicator 212 may produce the indication of the status of the latch 208 in response to a determination that the seat assembly 202 is occupied based on the indication from the occupancy sensor 206.

The indication from the occupancy sensor 206 may default to an occupied or unoccupied state. For example, from a safety perspective, the occupancy sensor 206 may default to generate an occupied indication unless it is actively determined or confirmed that no occupant is in the seat 203. Additionally, the latch sensor 210, the latch indicator 212, or the computing device 214 may default to an occupied status for the seat 203. In this manner, if the occupancy sensor 206 malfunctions or otherwise fails to provide an indication as to the occupancy of the seat assembly 202, the occupant and/or staff will be notified if the latch 208 is unsecured.

The In some embodiments, the computing device 214 is located on a vehicle (for example, the vehicle 110 of FIG. 1) corresponding to the seat assembly 202. The computing device 214 may also be located at a central control location, such as an airport, bus station, sea port, transit center, or the like. While the computing device 214 is shown and described as containing multiple localized components, in other examples, one or more of the components of the computing device 214 may be remote from each other. In other words, the computing device 214 may be embodied as a single device or embodied as a collection of devices at one or more locations connected over a communication network.

In the illustrated embodiment, the computing device 214 includes a data module 216, a parameter module 218, and a transmission module 220. The data module 216, in one embodiment, is configured to receive data from the latch sensor 210 and the occupancy sensor 206. In certain embodiments, data from the latch sensor 210 and the occupancy sensor 206 are sampled based on manual input from a staff member or external system, a schedule or other internal input or parameter stored in the parameter module 218, or other triggers or inputs.

The data module 216 may also be connected to other sensors of a vehicle or sensors remote to the vehicle, in addition to the latch sensor 210 and the occupancy sensor 206. For example, the data module 216 may request and/or receive data from sensors for measuring or detecting an amount of force or pressure applied to brakes of a vehicle, such as while the vehicle 110 is slowing. In some embodiments, the sensors include sensors for detecting the acceleration, deceleration, speed, velocity, roughness, turbulence, and/or the like of a vehicle during some travel transition. In further embodiments, the sensors include sensors for determining or detecting an amount of thrust, for example, forward, reverse, or turning force, applied to the vehicle's engines or turning systems. Said sensors may provide a travel transition indication which indicates these or other transitions or changes during travel. This may include currently detected parameters and predicted or expected parameters.

The data module 216 may receive data from other systems of a vehicle, from a central transit hub, from other vehicles, or the like. The data received by the data module 216 may be data corresponding to a schedule, a proximity or time to a location or transition in travel. For example, the data module 216 may receive a prediction of a travel condition such as turbulence, cruise status, traffic jam, rough water, winds, slippery roads, or the like. The data module 216 may provide indications based on the data received at the data module 216 from these sensors, predictive systems, or other sources. In some embodiments, the data module 216 receives data corresponding to a turbulence status. A turbulence status may include an automated prediction of turbulence, an automated detection of current turbulence, a manual input indicating future turbulence, and a manual input indicating current turbulence.

In some embodiments, the data module 216 performs an operation on the data received at the data module 216. For example, the data module 216 may receive data in a first format and may convert the data to a second format. The operation may include a process which receives the data and normalizes, formats, organizes, or otherwise converts the data to a useable format. For instance, the sampled data may be aggregated, categorized by data source/sensor, structured using a structured language (e.g., XML), and/or the like prior to the data being sent to the airport computing system. The data module 216 may operate one or more lookup tables, access one or more databases, correlate the data to specific objects based on a programmed logic, instructions, or the like.

The parameter module 218 of the computing device 214 is configured to determine one or more parameters that describe a condition for the latch 208 based on the received data. As used herein, a sensor input or other data received by the parameter module 218 may be a variable, factor, coefficient, and/or the like that describes a state of the latch 208 or travel condition of a vehicle. In such an embodiment, the parameter module 218 may be located on the vehicle or remote relative to the vehicle and may calculate, determine, evaluate, correlate, etc., received data in response to the data module 216 receiving the data.

In one embodiment, the one or more parameters that the parameter module 218 determines, using the data received by the data module 216, include parameters relating to when and if an unsecured indication should be provided. For example, the parameter module 218 may determine a timeframe for impact of a weather condition on the vehicle and generate a parameter based on this timeframe. In another example, the parameter module 218 may determine a time to arrival at a location and determine a parameter based on this timing. In an additional example, the parameter module 218 may determine how a condition will affect the vehicle and establish a threshold for generating a warning to an occupant of the seat 203, or staff corresponding to the vehicle, based on the impact to the occupant or the vehicle. In some embodiments, the parameter generated by the parameter module 218 is based on one or more characteristics of the vehicle. In other embodiments, the parameter is generated based on dynamic or changing variable. The parameters may be saved to the computing device 214, shared across a network to other vehicles or systems, or dynamically adjusted based on other criteria.

The transmission module 220 transmits the indicator, the one or more determined parameters, and/or other data to the latch indicator 212, a proximal indicator 222, a remote indicator 224, another vehicle, a central transit control or storage location, or other recipient. In certain embodiments, the transmission module 220 transmits the determined parameters over a data network. In further embodiments, the data module 216 may be located on a vehicle that detects data via sensors or other instruments and may receive data from the various sensors. Additionally, or alternatively, the parameter module 220 may determine the one or more parameters, and may share the determined parameters directly with other recipients over, for example, a peer-to-peer network, a mesh network, an ad-hoc network, and/or other wireless network.

In certain embodiments, the transmission module 220 and/or the parameter module 218 store the one or more determined parameters in a remote location, a cloud location, at a central transit control, and/or the like. In one embodiment, the transmission module 220 accesses the one or more determined parameters from the storage location and sends, transmits, shares, and/or the like the one or more determined parameters. In certain embodiments, other vehicles may have direct access to the storage locations for the parameter data and may access the parameter data from the storage location at, for example, a cloud or other remote location.

In some embodiments, the data module 216 also receives manual input from staff corresponding with the vehicle 110. The manual input may include a command to initiate the latch indicator 212. The manual input may also include one or more variables, which the parameter module 218 may incorporate into the calculation of the one or more parameters and/or otherwise enhance with the one or more parameters. For example, the pilot of an aircraft may input a detected turbulence event, or a driver may input a road condition. The transmission module 220 may also transmit the subjective data from staff to other staff within a range of influence of the event, in addition to the calculated parameters.

The computing device 214 may receive an update of new data. The update may include data for the data module 216, the parameter module 218, and/or the transmission module 220. For example, the update of new data may include improved notice times for sending a warning corresponding to a detected event. In another example, the computing device 214 may be updated with new safety protocols or requirements. It is recognized that while some embodiments of the seatbelt security system 104 described herein include the computing device 214, other embodiments the seatbelt security system 104 may operate without a computing device or other computer processing components.

The proximal indicator 222 of the seat assembly 202 is similar to the latch indicator 212. The proximal indicator 222 may be in lieu of or in conjunction with the latch indicator 212. For example, the proximal indicator 222 may be activated simultaneously with the latch indicator 212. The proximal indicator 222 may also be activated after a time delay following activation of the latch indicator 212. In this manner, in one example, the occupant of the seat 203 is notified via the latch indicator 212 and, if the latch 208 is not coupled within a certain time, the proximal indicator 222 may be activated as an additional warning to the occupant. Alternatively, the proximal indicator 222 may be initially activated with the latch indicator 212 being activated later in an analogous manner.

As presented above, with reference to the latch indicator 212, the proximal indicator 222 may produce a visual, audio, or tactile warning of the status of the latch 208. The proximal indicator 222 is an indicator that is positioned near the seat 203, so as to be identified as corresponding to the seat 203, or positioned in a general vicinity of the seat 203. For example, in an aircraft, the proximal indicator 222 may be located on an overhead panel directly above the seat 203. In this manner, the proximal indicator 222 may alert the occupant of the seat 203 as well as staff, such as flight crew, that the latch 208 of the corresponding seat assembly 202 is not secured. In some embodiments, the proximal indicator 222 is positioned to be perceived by the staff and is less visible or readily perceived by the occupant of the seat assembly 202.

The proximal indicator 222 may identify the corresponding seat 203 by the position of the proximal indicator 222 relative to the seat 203. In some embodiments, the proximal indicator 222 includes other identifying features to identify the seat 203 to which the proximal indicator 222 corresponds. For example, the proximal indicator 222 may have a seat number or position visual or audio cue identifying the seat 203. In some embodiments, the proximal indicator 222 corresponds to a general region or area of a vehicle which corresponds to the seat 203. For example, the proximal indicator 222 may identify a row or other group of seats 203 in which a latch 208 is unsecured. This may allow a staff or group of occupants to be notified of an unsecured latch 208 in a particular area without the need for individual latch indicators 212 corresponding to individual seats 203.

The remote indicator 224 of the seatbelt security system 104 includes a central display 226 and/or a mobile device 228. The remote indicator 224 is an indicator that is remote relative to the seat assembly 202. The remote indicator 224 may include an indicator in a staff area such as a cockpit, a driver display, staff quarters or staging area, a central transit location such as an airport, bus stop, port, or the like. For example, on an aircraft, the central display 226 may include a central panel on which the flight crew can view the status of the seatbelt 204 for each seat 203 or a corresponding portion of the aircraft. The central display 226 may be a display capable of showing a state of the seatbelt 204. The central display 226 may identify a specific seat 203.

The central display 226 may be reactive to crew input to execute a corresponding action. For example, the central display 226 may display an alert or indication of an unsecure seatbelt 204 and allow the flight crew to tap, click, scroll, or otherwise supply an input to filter down to an area of the aircraft or the specific seat 203. The central display 226 may also facilitate other actions. For example, the central display 226 may allow the flight crew to initiate a warning at the seat assembly 202, such as a warning to the latch indicator 212 to alert the occupant of the seat assembly 202. In another example, the central display 226 allows the flight crew to communicate with the seat occupant through voice communication or other stimulus. The communication may be automated, such as a pre-recorded message or displaying a prepared message on an entertainment or other display screen. The communication may also be a direct line of communication with the flight crew to speak with the seat occupant. In some embodiments, the central display 226 may be linked with other regions or displays of the vehicle.

The mobile device 228 of the remote indicator 224 may provide the above-described functionality of the central display 226. In some embodiments, the mobile device 228 includes a smart phone, a tablet computer, a wearable device, or the like. The mobile device 228 may provide information to the staff regarding a state of the latch 208. The mobile device 228 may facilitate input from the staff to execute an operation in response to the input. In some examples, the mobile device 228 may correspond to a member of the staff. In another example, the mobile device 228 may correspond to the vehicle or a portion of the vehicle. The mobile device 228 may receive data from the transmission module 220 or another source.

In some embodiments, the seatbelt security system 104 facilitates the communication of various signals and warnings to and from the various components of the seatbelt security system 104. For example, a passenger list and seating assignment information may be sent from a central server to a vehicle (e.g., the computing device 214 on the vehicle). In turn, the information may be relayed to one or more mobile devices such as a smart watch, phone, tablet, or other mobile device. The computing devices 214 may include corresponding display devices capable of displaying indications, warnings, and the like.

Figure 2B:
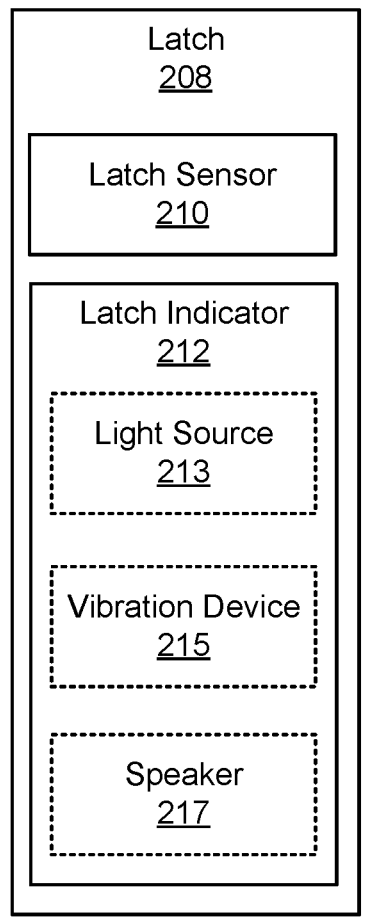
FIG. 2B is a schematic block diagram of the latch of FIG. 2A.

FIG. 2B is a schematic block diagram of the latch 208 of FIG. 2A. In the illustrated embodiment, the latch indicator 212 of the latch 208 includes at least one of a light source 213, a vibration device 215, and a speaker 217. The light source 213 may be positioned on the latch 208 to emit light from a surface, or multiple surfaces, of the latch 208. The light source 213 may have one or more characteristics including light patterns, intensities, colors, and the like. For example, the light source 213 may provide a flashing pattern, a dimming and brightening intensity, and one or more distinct colors. In some embodiments, the one or more characteristics of the light corresponds to a status of the latch 208, occupancy of the seat 203, a state of a vehicle, or other considerations. For example, a color of the light produced by the light source 213 may indicate an urgency to time until an expected travel transition or event such as a descent, landing, docking, up-anchor, parking, etc.

Similar to the light source 213, the vibration device 215 may provide a stimulus to the occupant of the seat 203 to prompt the occupant to properly secure the latch 208. The vibration device 215 may provide vibrations in various patterns and intensities to communicate at least one of a specific condition, timing, and urgency to an occupant of the seat 203.

Like the light source 213 and the vibration device 215, the speaker 217 may be incorporated into the latch 208 to provide an auditory feedback to the occupant of the seat 203. The auditory feedback may include a beeping, a constant or variable tone, a spoken message, or other signals with various patterns, intensities, messages, tones, and the like.

In some embodiments, one or more of the light source 213, the vibration device 215, and the speaker 217 may be incorporated together to be activated simultaneously, in stages, or in response to specific occupant needs, specific travel transitions or events, or other conditions.

Figure 3:
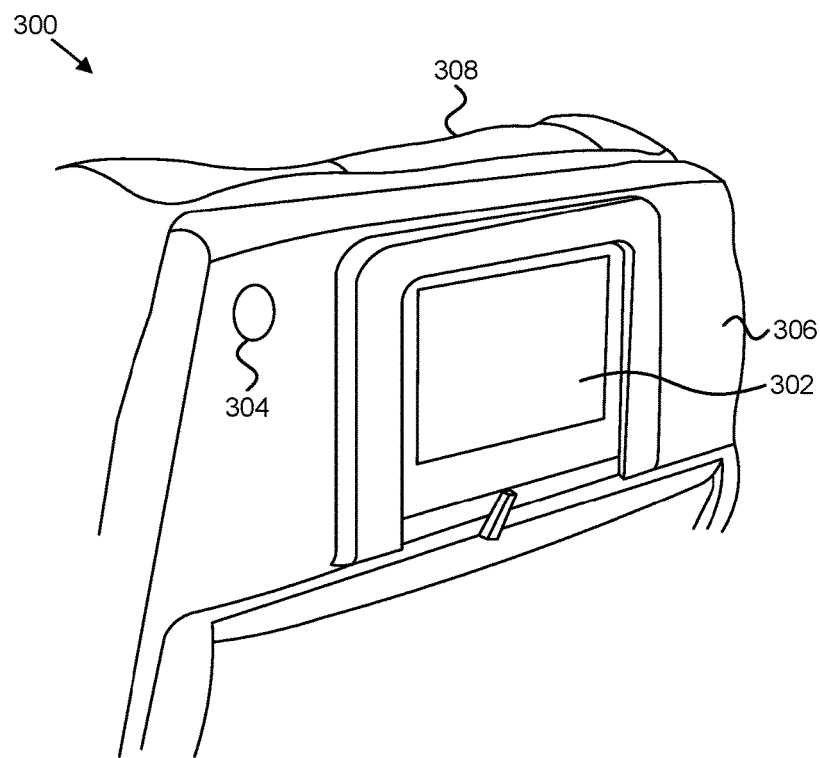
FIG. 3 is a perspective view of a seatback display that can be used with the seatbelt security system of FIG. 2A.

FIG. 3 is a perspective view of a seatback display 300 that incorporate one or more of the features of the seatbelt security system 104 of FIG. 2A. For example, in one embodiment, the seatback display 300 is one example of the proximal indicator 222 of the seatbelt security system 104. In the illustrated embodiment, the seatback display 300 is integrated into a seatback 306 of a seat 308. The seatback 306 is disposed on a rear portion of the seat 308 and faces a seat rearwardly adjacent the seat 308. The seatback display 300 includes display screen 302 that is positioned for viewing by a user occupying the seat rearwardly adjacent the seat 308.

The display screen 302 may receive an indication from at least one component (e.g., the computing device 214) of the seatbelt security system 104 that the seatbelt 204, of the user positioned to view the display screen 302, is not secured. The display screen 302 may pause a current display object to communicate a warning to the user. The current display object may be an advertisement, a map, a screen saver, an entertainment or information program, or other visual media. In some embodiments, the display screen 302 may be activated from a deactivated state in response to receipt of the indication that the corresponding seatbelt is unsecured. In some embodiments, the display screen 302 may adjust a brightness, flash the display, or otherwise attract the attention of the user.

In response to the indication that the seatbelt of the user is not secure, the display screen 302 may present a warning which communicates, to the user, that the seatbelt is not properly secured. The warning may include instructions describing how to properly secure the seatbelt. The warning may include instructions describing how to request help securing the seatbelt. For example, the warning may instruct a user to operate a staff call feature.

In the illustrated embodiment, the seatback display 300 may also include a seatback indicator 304 disposed in the seatback 306 of the seat 308. The seatback indicator 304 is one example of a proximal indicator 222 described above and illustrated in FIG. 2A. The seatback indicator 304 may be a visual or audio indicator, such as a light or speaker, to attract the attention of the user and/or the staff. In some embodiments, the seatback indicator 304 is activated in response to a determination that the corresponding seatbelt is not properly secured. The seatback indicator 304 may be activated in response to a detection that the corresponding seat is occupied, and the corresponding seatbelt is not secured. The seatback indicator 304 may be activated in conjunction with the display screen 302 and/or other indicators. In some embodiments, the seatback indicator 304 and the display screen 302 communicate other alerts such as the need to secure a tray, position a seatback in an upright position, deactivate an electronic device, or the like.

Figure 4:
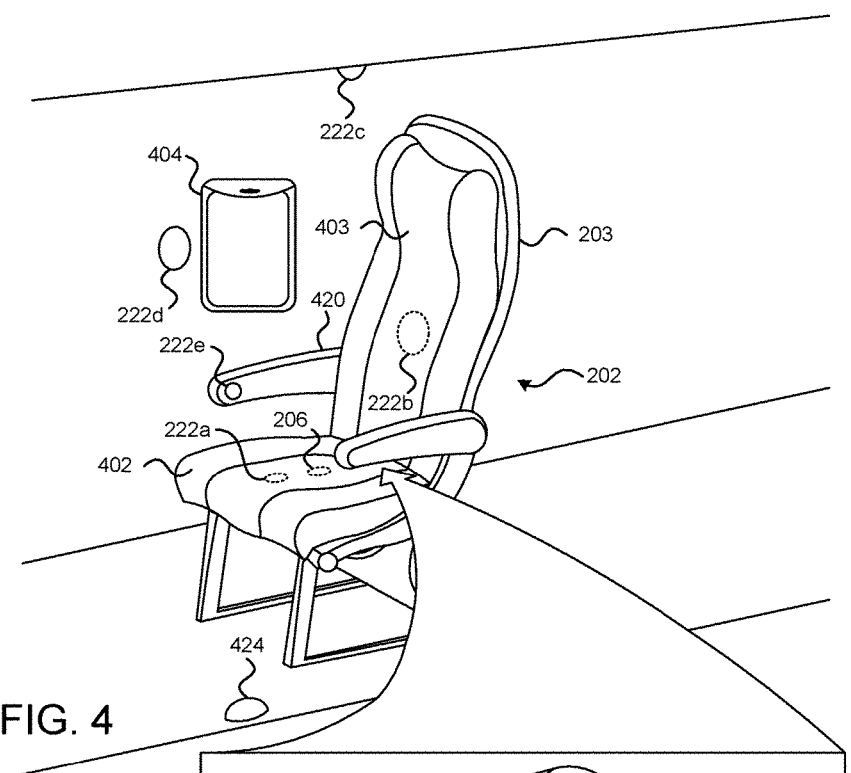
FIG. 4 is a perspective view of a seat assembly that can be used with the seatbelt security system of FIG. 2A.

FIG. 4 is a perspective view of a seat assembly 202 of a seatbelt security system 104, according to one or more examples of the present disclosure. In the illustrated embodiment, the seat assembly 202 includes an occupancy sensor 206 disposed in a sit pad 402 of the seat assembly 202. The sit pad 402 also includes a sit pad proximal indicator 222a. The sit pad proximal indicator 222a is positioned in the sit pad 402 of the seat assembly 202 to communicate, to the occupant of the seat 203, a warning that the seatbelt 204 is not properly secured. As described herein, the sit pad proximal indicator 222a may produce a visual, audio, or tactile warning to the occupant. While the sit pad proximal indicator 222a is shown at a specific location in the sit pad 402 of the seat assembly 202, one or more sit pad proximal indicators 222a may be positioned at any location on or within the sit pad 402. While a single sit pad proximal indicator 222a is shown, multiple sit pad proximal indicators 222a may also be incorporated into the sit pad 402 of the seat assembly 202.

The seat assembly 202 may include a back pad proximal indicator 222b disposed in the seat assembly 202 on or in a back pad 403 of the seat assembly 202. In other words, the back pad proximal indicator 222b may be disposed on a surface of the back pad 403 of the seat assembly 202 or beneath the surface of the back pad 403 of the seat assembly 202. The back pad proximal indicator 222b may be positioned along a height of the seat assembly 202 to contact an average occupant at a location on the occupant that is likely to draw the attention of the occupant. While a single back pad proximal indicator 222b is shown, multiple back pad proximal indicators 222b may also be incorporated into the back pad 403 of the seat assembly 202.

The seat assembly 202 can also include an overhead proximal indicator 222c. The illustrated embodiment of the overhead proximal indicator 222c is one embodiment of the proximal indicator 222 of FIG. 2A. The overhead proximal indicator 222c may be disposed on an overhead portion of a vehicle such as an overhead panel, console, ceiling, headliner, or the like. The overhead proximal indicator 222c may be positioned directly over or to spatially correspond to the seat assembly 202. The overhead proximal indicator 222c may be positioned to be visible to one or both of the occupant of the seat 203 or the staff.

The seat assembly 202 may also include a wall proximal indicator 222d. The wall proximal indicator 222d is another embodiment of the proximal indicator 222 of FIG. 2A. The wall proximal indicator 222d may be disposed to spatially correspond with the seat 203. The wall proximal indicator 222d may correspond to the seat 203 or a group of seats. The wall proximal indicator 222d may be located near a window 404 or other structure. In some embodiments, one or more of the various proximal indicators of the seat assembly may interface with other systems or structures. For example, the wall proximal indicator 222d may generate a visual stimulus by opening the window 404. In another example, the wall proximal indicator 222d or other proximal indicator 222 may turn on a reading light, sound an individual seatbelt chime, vibrate the seat 203, or the like.

In the illustrated embodiment, the seat assembly 202 may additionally include an armrest proximal indicator 222e disposed in or on an armrest 420 of the seat assembly 202. The seat assembly 202 may further includes a floor proximal indicator 222f disposed on the floor in a proximity of the seat 203. The armrest proximal indicator 222e and the floor proximal indicator 222f illustrate other embodiments of the proximal indicator 222. While various examples of proximal indicators 222a-f are described herein, other proximal indicators 222 may be located or arranged to provide a stimulus to an occupant of the seat 203 to communicate a warning that the seatbelt 204 is not properly secured.

Figure 5:
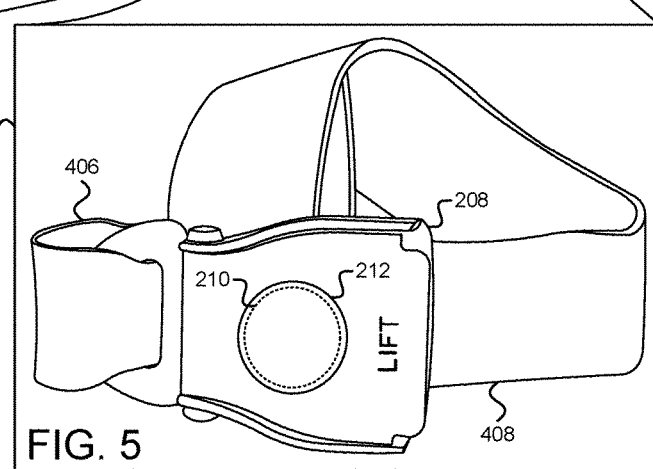
FIG. 5 is a perspective view of a seatbelt that can be used with the seat assembly of FIG. 4.

FIG. 5 is a perspective view of a seatbelt 204 of the seat assembly 104 of FIG. 4. The seatbelt 204 corresponding with the seat 203 of the seat assembly 202 to help secure an occupant of the seat 203. The seatbelt 204 includes a latch 208 with a latch sensor 210 and a latch indicator 212. In the illustrated embodiment, the latch sensor 210 is disposed in the latch 208 and aligned with the latch indicator 212. The latch sensor 210 may be integrated with the latch indicator 212. The latch sensor 210 may also be separate from the latch indicator 212. The latch indicator 212 may be coupled to the latch 208 to communicate a vibration to the latch 208 in response to a determination that the latch 208 of the seatbelt 204 is not properly secured. The latch indicator 212 may include a visual component disposed at a first side of the latch 208 to be visible when positioned on the user or setting on the seat. The latch indicator 212 may also include a second visual component disposed on a second side of the latch 208 to be visible when the latch 208 is upside down on the seat assembly 202 or user. In some embodiments, the latch indicator 212 is a tactile component to provide a vibration, thump, or other tactile stimulus to a user. The tactile component of the latch indicator 212 may be positioned external or internal to the latch 208. The latch indicator 212 may also include an audio indicator to provide a sound in response to a determination that the latch 208 is not properly secured. Any one or a combination of the visual, audio, and tactile components may be included in the latch indicator 212.

In the illustrated embodiment, the latch 208 couples a first strap 406 of the seatbelt 204 to a second strap 408 of the seatbelt 204. The latch 208 may include a receiver portion coupled to one of the first strap 406 and the second strap 408 and an insert coupled to the other of the first strap 406 and the second strap 408. In some embodiments, the latch sensor 210 is disposed in the receiver, in the insert, or in both the receiver and the insert of the latch 208. Similarly, the latch indicator 212 may be disposed in the receiver, in the insert, or in both the receiver and the insert of the latch 208.

Figure 6:
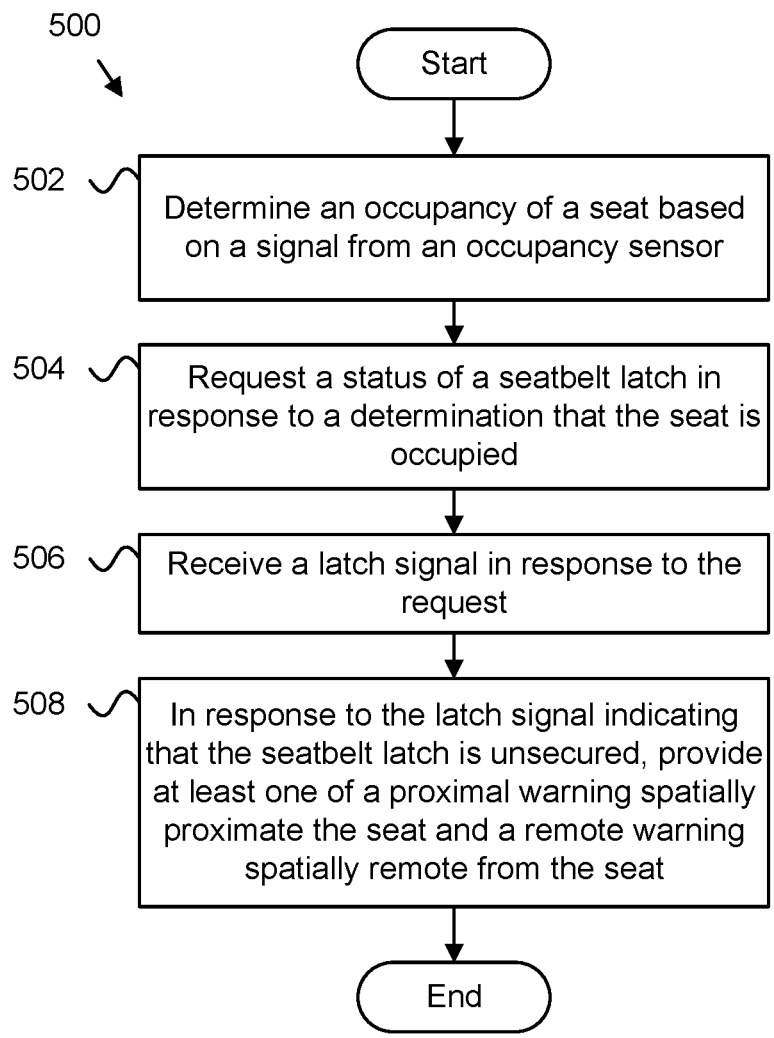
FIG. 6 is a schematic flow diagram of a method for dynamically providing seatbelt security using the systems and assemblies shown in FIGS. 1-5.

FIG. 6 is a schematic flow diagram of one embodiment of a method 500 for dynamically providing seatbelt security using the systems and assemblies shown in FIGS. 1-5. The method 500 begins and determines 502, by a computing device 214, an occupancy of a seat assembly 202 based on a signal from an occupancy sensor 206. In some embodiments, the determination of occupancy is made at the occupancy sensor 206. Alternatively, the signal from the occupancy sensor 206 is provided to a computing device 214. The computing device 214 may intake the signal from the occupancy sensor 206 and interpret the signal to determine the occupancy of the seat 203. The signal may be a binary occupied/unoccupied signal, or the signal may describe a pressure metric or pattern to distinguish between an occupant and an inanimate object, for example, a pillow or luggage. The computing device 214 may correlate a time component to the signal from the occupancy sensor 206. For example, the computing device 214 may determine that the seat 203 is occupied only after a period of time had elapsed without a detectable vacancy in the seat 203.

The method 500, in certain embodiments, requests 504, by the computing device 214, a status of a seatbelt latch 208 in response to a determination that the seat assembly 202 is occupied based on the signal from the occupancy sensor 206. In some embodiments, the computing device 214 determines that the seat 203 is occupied in response to the signal from the occupancy sensor 206 being within an expected range based on average loads or metrics specific to the occupant of the seat 203. In response to the computing device 214 determining that the seat 203 is occupied, the computing device 214 may ping or otherwise prompt a response from a latch sensor 210. In some embodiments, the status of the seatbelt latch 208 is stored in a database on, or in communication with, the computing device 214. The computing device 214 may query the latch sensor 210 or other device or component to prompt the status of the seatbelt latch 208 be provided, or made accessible, to the computing device 214.

As described above, the request may be prompted by an input from the occupancy sensor 206 and may also include inputs from an automated or manual system detecting a travel transition. For example, the travel transition may include a take-off, landing, turbulence, rough water, crossing, turning, stop, braking, acceleration, or similar detected, planned, anticipated, or manually indicated event.

The method 500, in one embodiment, receives 506 a latch signal in response to the request. As mentioned above, the latch signal may be provided directly from the latch sensor 210 or from another component or system in communication with the latch sensor 210. The latch signal may be provided over an, at least partially, wired or wireless connection. In some examples, the latch signal may be provided continuously to the computing device 214 or another component. Alternatively, the latch signal may be provided in response to the request from the computing device 214.

The method 500, in one embodiment, in response the latch signal indicating the seatbelt latch 208 is unsecured, providing 508 at least one of a proximal warning spatially proximate the seat 203 and a remote warning spatially remote from the seat 203. In some embodiments, the remote warning indicates a status of the seatbelt latch 208 and identifies the seat 203 from a plurality of seats. The computing device 214 may determine a type of warning to provide based on any one or more of a plurality of variables. For example, the computing device 214 may determine that a timeframe is relatively short in which to respond and secure the seatbelt 204 and thus activate both the proximal warning and the remote warning. The computing device 214 may select the warning based on a look-up table, logic parameters, or the like. The selection of the warnings may be based on an identified need or ability of an occupant of the seat 203 or may be based on a selection made by a pilot, driver, staff, safety specialist, controller, or other staff or by the occupant itself.

For example, the seat 203 may be a seat on an aircraft, train, ship, bus, or other common carrier. The driver or staff may receive a warning which indicates which seat to check. This may drastically reduce the time needed to identify and remedy an unsecured seatbelt 204. The shortened time may allow the staff to return to a safe position and/or decrease the chance of injury or stress to both staff and occupant.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up", "down", "upper", "lower", "horizontal", "vertical", "left", "right", "over", "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including", "comprising", "having", and variations thereof mean "including but not limited to" unless expressly specified otherwise. An enumerated listing of items does not imply that any or all the items are mutually exclusive and/or mutually inclusive, unless expressly specified otherwise. The terms "a", "an", and "the" also refer to "one or more" unless expressly specified otherwise. Further, the term "plurality" can be defined as "at least two".

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit", "module", or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A seat assembly comprising:
   a seat; and
   a seatbelt coupled to the seat, wherein the seatbelt comprises:
      a first strap;
      a second strap; and
      a latch configured to selectively secure the first strap relative to the second strap, the latch comprising:
         a latch sensor configured to provide a secured indication in response to detection that the latch properly secures the first strap of the seatbelt to the second strap of the seatbelt and provide an unsecured indication in response to detection that the latch does not properly secure the first strap of the seatbelt to the second strap of the seatbelt; and
         a proximal indicator configured to provide a warning in response to the unsecured indication, the proximal indicator being positioned separate from the seatbelt and spatially corresponding with the seatbelt.

2. The seat assembly of claim 1, further comprising an occupancy sensor configured to provide an occupied indication in response to the seat being occupied and to provide an unoccupied indication in response to the seat being unoccupied, wherein the proximal indicator is configured to prevent a warning in response to the unsecured indication when the occupancy sensor provides the unoccupied indication.

3. The seat assembly of claim 1, wherein the proximal indicator is configured to produce at least one of a light, a sound, or a vibration in response to the unsecured indication.

4. The seat assembly of claim 1, wherein the proximal indicator comprises a display screen configured to provide a visual warning in response to receiving the unsecured indication.

5. The seat assembly of claim 4, wherein the visual warning comprises an indication of a status of the seatbelt.

6. The seat assembly of claim 4, wherein the visual warning comprises instructions describing how to properly secure the seatbelt.

7. The seat assembly of claim 6, wherein the display screen is configured to interrupt a current active display object to communicate the warning to the user of the seatbelt.

8. The seat assembly of claim 1, wherein the proximal indicator on the latch comprises at least one of a light source capable of producing illumination in response to the unsecured indication, a vibration device capable of producing vibrational stimulus in response to the unsecured indication, and a speaker capable of producing audio stimulus in response to the unsecured indication.

9. The seat assembly of claim 1, wherein the latch sensor communicates with a computing device to generate at least one of the secured indication and the unsecured indication.

10. The seat assembly of claim 9, wherein the proximal indicator is in communication with the computing device to provide the warning in response to the unsecured indication.

11. A seatbelt security system comprising:
   a seat assembly comprising:
      a seat;
      a seatbelt coupled to the seat, wherein the seatbelt comprises;
         a first strap;
         a second strap; and
         a latch configured to selectively secure the first strap relative to the second strap, the latch comprising a latch sensor configured to detect that the first strap is properly secured to the second strap via the latch and to detect that the first strap is not properly secured to the second strap via the latch; and
      a proximal indicator spatially proximate the seat, wherein the proximal indicator is configured to provide a proximal warning, the proximal indicator being positioned separate from the seatbelt and spatially corresponding with the seatbelt;

a computing device configured to provide an unsecured indication in response to detection by the latch sensor that the first strap of the seatbelt is not properly secured to the second strap of the seatbelt via the latch; and a remote indicator positioned to provide a remote warning at a location separate from the seat assembly in response to the unsecured indication.

12. The seatbelt security system of claim 11, wherein the seat assembly further comprises an occupancy sensor configured to provide an occupied indication in response to the seat assembly being occupied and to provide an unoccupied indication in response to the seat assembly being unoccupied, wherein the proximal indicator is configured to prevent a warning in response to the unsecured indication when the occupancy sensor provides the unoccupied indication.

13. The seatbelt security system of claim 11, wherein the computing device is further in communication with the remote indicator, the computing device being configured to activate and deactivate at least one of the latch sensor, the proximal indicator, and the remote indicator in response to at least one of a manual input from a crew member, a turbulence status, a cruise status, and a travel transition indication.

14. The seatbelt security system of claim 11, wherein the latch further comprises a latch indicator coupled to the latch, wherein the computing device activates the latch indicator to provide a warning at the latch in response to the unsecured indication.

15. The seatbelt security system of claim 11, wherein the remote indicator comprises at least one of a central display and a mobile device, wherein the computing device activates the at least one of the central display and a mobile device to provide the remote warning in response to the unsecured indication.

16. A method for seatbelt security, the method comprising:

determining an occupancy of a seat based on a signal from an occupancy sensor;

requesting a status of a seatbelt latch in response to a determination that the seat is occupied;

receiving a latch signal from a latch sensor in response to the request; and in response to at least the latch signal indicating that the seatbelt latch is unsecured, providing at least one proximal warning spatially proximate the seat.

17. The method of claim 16, wherein the at least one of the proximal warning and the remote warning is provided further in response to at least one of:

receiving a manual input to activate a secure seatbelt mode for the seat assembly; and receiving a detection of at least one travel transition.

18. The method of claim 16, wherein providing the proximal warning comprises generating the proximal warning at at least one of a latch indicator and a proximal indicator.

19. The method of claim 16, further comprising providing a remote warning spatially remote from the seat in response to at least the latch signal indicating that the seatbelt latch is unsecured, wherein providing the remote warning comprises activating a central display spatially remote from the seat to display the remote warning.

20. The method of claim 19, wherein providing at least one of the proximal warning and the remote warning comprises activating a mobile device to display a warning.

* * * * *